(12) United States Patent
Liu

(10) Patent No.: US 10,353,444 B1
(45) Date of Patent: Jul. 16, 2019

(54) HARD DISK FIXING ASSEMBLY

(71) Applicants: INVENTEC (PUDONG) TECHNOLOGY CORPORATION, Shanghai (CN); INVENTEC CORPORATION, Taipei (TW)

(72) Inventor: Chao-Chih Liu, Taipei (TW)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 0 days.

(21) Appl. No.: 16/219,376

(22) Filed: Dec. 13, 2018

(30) Foreign Application Priority Data

Oct. 8, 2018 (CN) .......................... 2018 1 1167323

(51) Int. Cl.
*G06F 1/16* (2006.01)
*H05K 5/00* (2006.01)
*H05K 7/00* (2006.01)
*G06F 1/18* (2006.01)
*G11B 33/12* (2006.01)

(52) U.S. Cl.
CPC ............ *G06F 1/187* (2013.01); *G06F 1/1658* (2013.01); *G11B 33/128* (2013.01)

(58) Field of Classification Search
CPC ...... G06F 1/187; G06F 1/1658; G06F 1/1656; G06F 1/183; G11B 33/128; G11B 33/125; G11B 33/127; G11B 33/12; G11B 33/121; G11B 33/123; G11B 33/124

USPC ............ 361/679.33, 679.34, 679.35, 679.36, 361/679.37, 679.38, 679.39
See application file for complete search history.

(56) References Cited

U.S. PATENT DOCUMENTS

| 8,411,429 | B2 * | 4/2013 | Li ......................... | G11B 33/124 361/679.33 |
| 8,432,680 | B2 * | 4/2013 | Peng ...................... | G06F 1/187 361/679.33 |
| 8,508,928 | B2 * | 8/2013 | Killen ................... | G11B 33/124 361/679.33 |
| 8,670,228 | B2 * | 3/2014 | Hiyama ................. | G06F 1/187 361/679.31 |
| 8,743,536 | B2 * | 6/2014 | Alo ....................... | H05K 5/0282 361/679.33 |
| 8,873,232 | B2 * | 10/2014 | Tsai ....................... | G06F 1/187 312/223.2 |
| 8,902,579 | B1 * | 12/2014 | Lalouette ................ | G06F 1/187 361/679.33 |

* cited by examiner

*Primary Examiner* — Anthony M Haughton
(74) *Attorney, Agent, or Firm* — Maschoff Brennan

(57) ABSTRACT

A hard disk fixing assembly configured to be disposed in casing includes base frame, pivotable frame, hard disk bearing frame, at least one first link and handle. Base frame includes bottom part and elastic part. Bottom part is configured to be fixed to casing. Elastic part is connected to bottom part. Pivotable frame is pivotably disposed on base frame. Hard disk bearing frame is slidably disposed on pivotable frame and hard disk bearing frame bears at least one hard disk. Two opposite sides of first link are respectively pivotally connected to hard disk bearing frame and base frame. Handle is pivotably disposed on hard disk bearing frame. When handle is pivoted, elastic part forces pivotable frame to move hard disk bearing frame from level position to inclined position.

8 Claims, 7 Drawing Sheets

HARD DISK FIXING ASSEMBLY

CROSS-REFERENCE TO RELATED APPLICATIONS

This non-provisional application claims priority under 35 U.S.C. § 119(a) on Patent Application No(s). 201811167323.4 filed in China on Oct. 8, 2018, the entire contents of which are hereby incorporated by reference.

BACKGROUND OF THE INVENTION

1. Technical Field of the Invention

The invention relates to a fixing assembly, more particularly to a hard disk fixing assembly that is able to position the hard disk bearing frame in a level position or an inclined position.

2. Description of the Related Art

With the development and advancement of the technology, electronic devices, such as computers and servers, have become indispensable in daily life. Take a server as an example; it usually includes electronic components such as a mother board, a central processing unit, a hard disk, a memory, and a server chassis for accommodating these electronic components.

However, the server becomes much more compact and complicated than ever, so it requires more time to be assembled. For instance, in order to install the hard disk, it requires to mount the hard disk to a hard disk tray and then to mount the hard disk tray into the server chassis, and the process of which is complicated and time-consuming. Therefore, how to shorten the time for installing the hard disk becomes one of the issues in this field.

SUMMARY OF THE INVENTION

An embodiment of the invention provides a hard disk fixing assembly that is configured to be disposed in a casing. The hard disk fixing assembly includes a base frame, a pivotable frame, a hard disk bearing frame, at least one first link, a handle and at least one second link. The base frame comprises a bottom part and an elastic part. The bottom part is configured to be fixed to the casing. The elastic part is connected to the bottom part in a swinging manner. The pivotable frame is pivotably disposed on the base frame and the elastic part presses against the pivotable frame. The hard disk bearing frame is slidably disposed on the pivotable frame and the hard disk bearing frame bears at least one hard disk. Two opposite sides of the at least one first link are respectively pivoted to the hard disk bearing frame and the base frame. The handle is pivotably disposed on the hard disk bearing frame. Two opposite sides of the at least one second link are respectively pivoted to the hard disk bearing frame and the pivotable frame. When the handle is pivoted with respective to the hard disk bearing frame, the handle and the at least one second link move the hard disk bearing frame with respect to the pivotable frame, the hard disk bearing frame that is moving pivots the pivotable frame with respect to the base frame via the at least one first link, and the pivotable frame is pushed by the elastic part so as to incline the hard disk bearing frame from a level position to an inclined position.

BRIEF DESCRIPTION OF THE DRAWINGS

The present invention will become more fully understood from the detailed description given hereinbelow and the accompanying drawings which are given by way of illustration only and thus are not limitative of the present invention and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
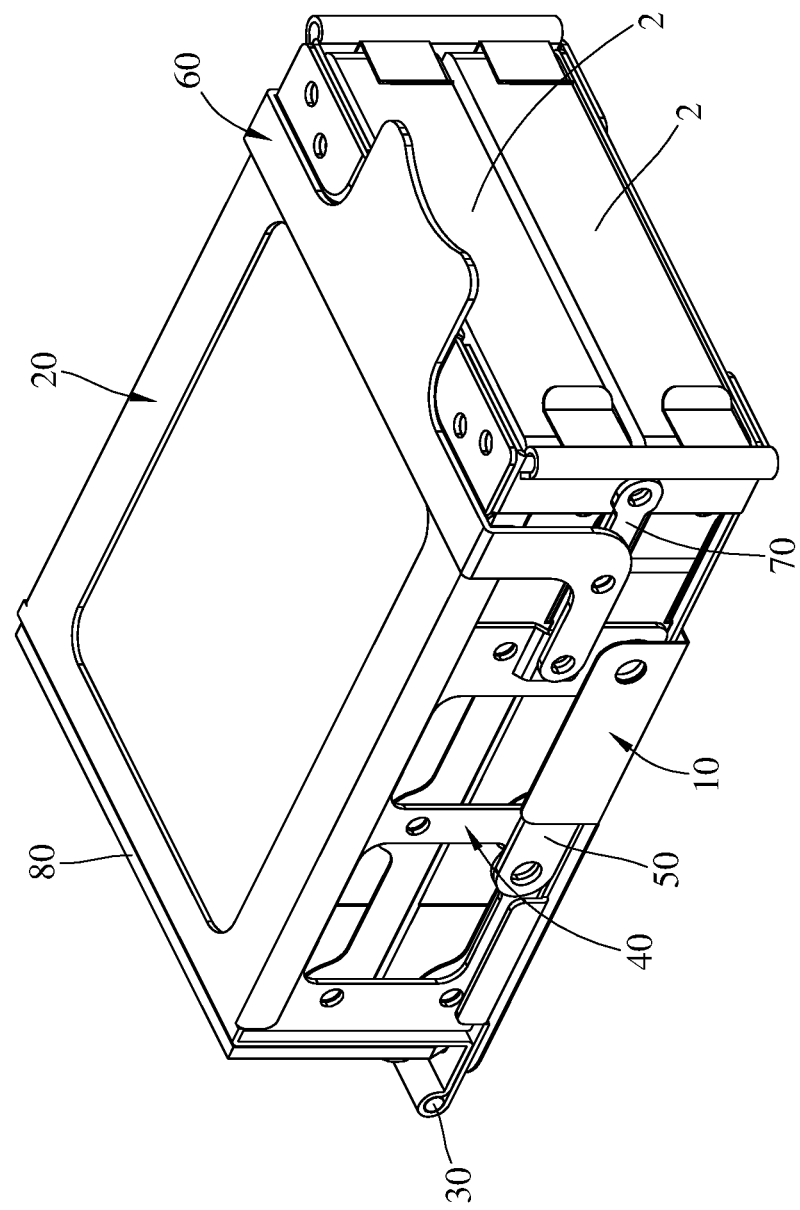
FIG. 1 is a prospective view of a hard disk fixing assembly accommodating hard disks according to a first embodiment of the invention.
Figure 2:
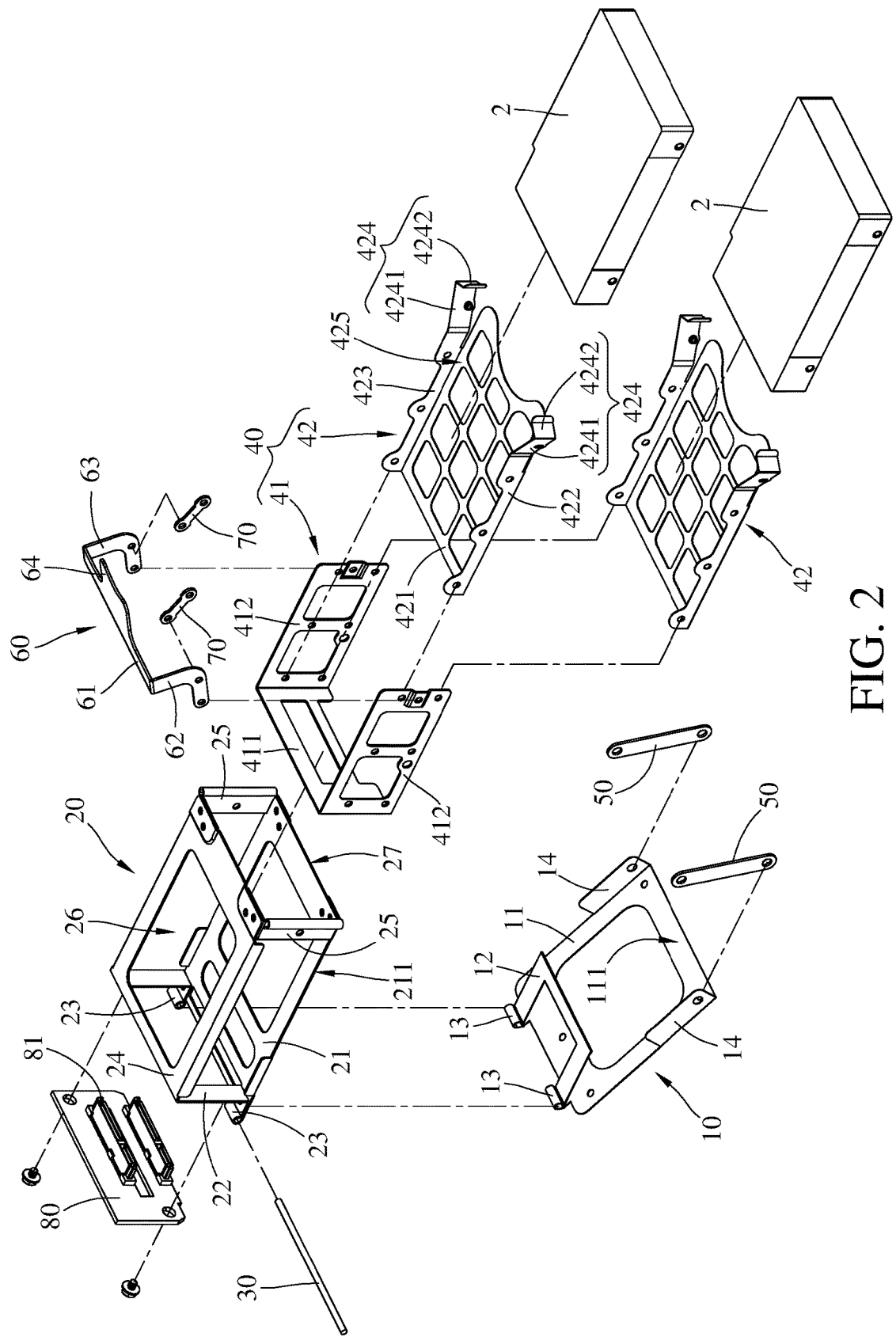
FIG. 2 is an exploded view of FIG. 1.
Figure 3:
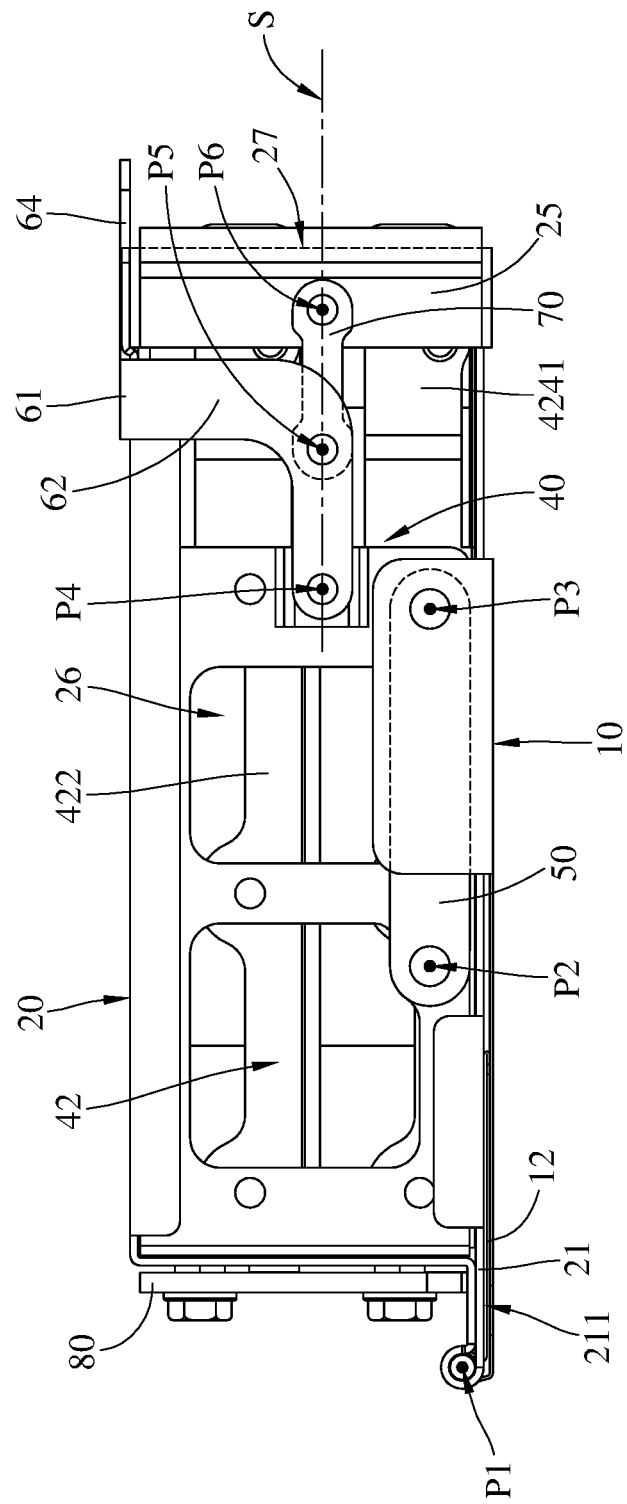
FIG. 3 is a side view of FIG. 1.
Figure 4:
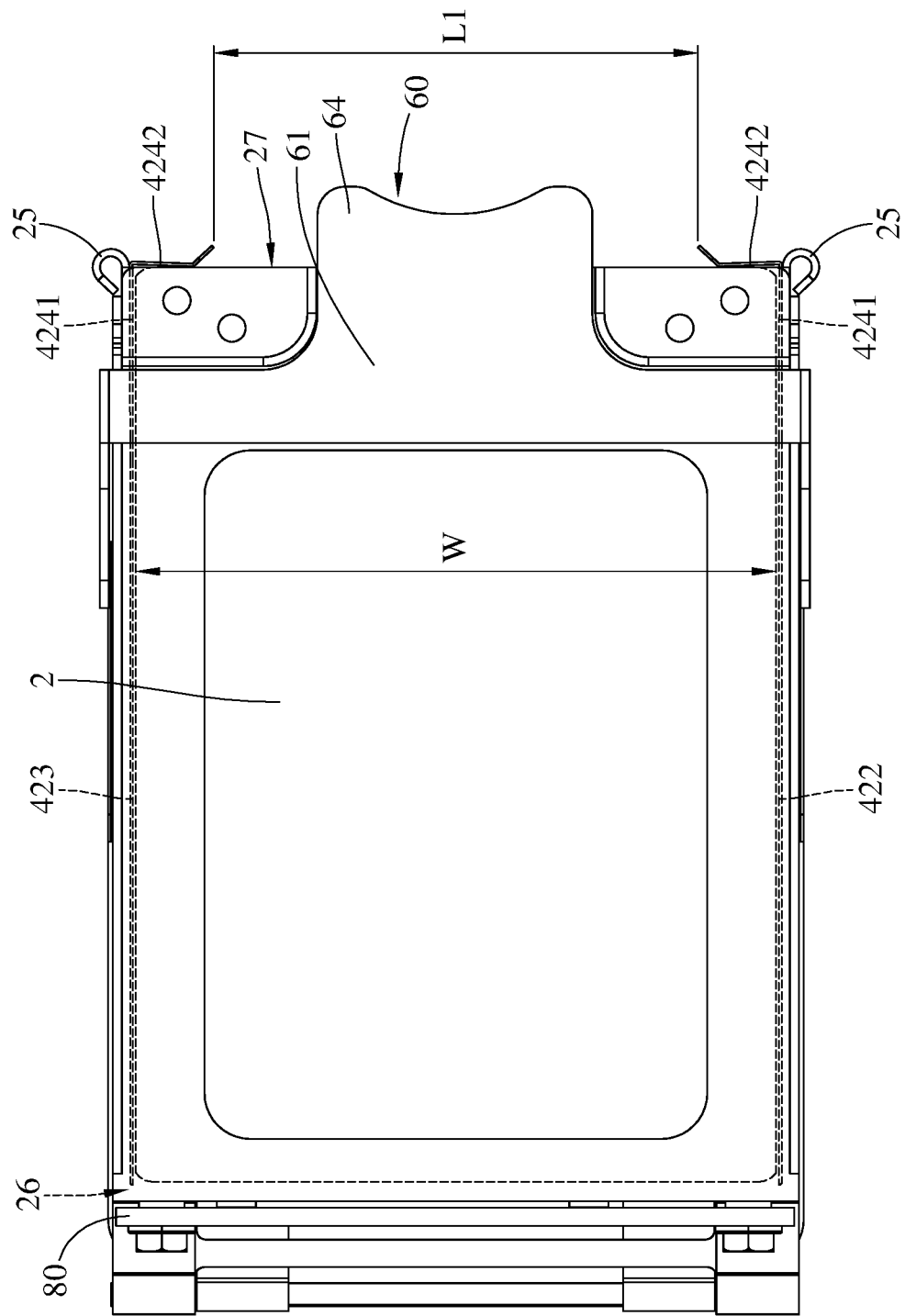
FIG. 4 is a top view of FIG. 1.

Please refer to FIG. 1 to FIG. 4. FIG. 1 is a prospective view of a hard disk fixing assembly accommodating hard disks according to a first embodiment of the invention. FIG. 2 is an exploded view of FIG. 1. FIG. 3 is a side view of FIG. 1. FIG. 4 is a top view of FIG. 1.

This embodiment provides a hard disk fixing assembly 1 configured to be disposed in a casing (not shown), such as a server casing.

The hard disk fixing assembly 1 includes a base frame 10, a pivotable frame 20, a pivot 30, a hard disk bearing frame 40, two first links 50, a handle 60, two second links 70 and a circuit board 80.

The base frame 10 includes a bottom part 11, an elastic part 12 and two first knuckle parts 13. The bottom part 11 is connected to the elastic part 12 via the first knuckle part 13, such that the elastic part 12 is able to be pivoted with respect to the bottom part 11. The bottom part 11 has a first surface 111.

The pivotable frame 20 includes a bottom part 21, a rear part 22, two second knuckle parts 23, a top part 24 and two side wall parts 25. The bottom part 21 is connected to the rear part 22 via the second knuckle part 23, and the bottom part 21 and the rear part 22 respectively extend toward different directions. The top part 24 is connected to a side of the rear part 22 that is away from the two second knuckle parts 23, and the top part 24 and the bottom part 21 are respectively located on two opposite sides of the rear part 22. The side wall parts 25 are located at the side of the pivotable frame 20 away from the rear part 22 and located between and connected to the top part 24 and the bottom part 21. The bottom part 21, the top part 24, the rear part 22 and the two side wall parts 25 form a first accommodation space 26 therebetween and an opening 27 connected to the first accommodation space 26. The bottom part 21 of the pivotable frame 20 has a second surface 211. The first surface 111 of the bottom part 11 faces the second surface 211 of the bottom part 21. The pivot 30 is disposed through the first knuckle parts 13 and the second knuckle parts 23, such that the pivotable frame 20 is able to be pivoted with respect to the base frame 10 about a first axis P1. The elastic part 12 of the base frame 10 presses against the second surface 211 of the bottom part 21 of the pivotable frame 20 so as to constantly apply a force for pivoting the pivotable frame 20 with respect to the base frame 10.

The hard disk bearing frame 40 includes a frame body 41 and two trays 42. The frame body 41 is slidably disposed in the first accommodation space 26. The frame body 41 includes a connecting part 411 and two side parts 412. The two side parts 412 are respectively connected to two opposite sides of the connecting part 411, and the two side parts 412 extend toward the same direction.

In this embodiment, the two trays 42 are fixed to the frame body 41 and stacked to each other. The two trays 42 are identical, so only one of the two trays 42 is described in this paragraph. The tray 42 includes a bottom plate 421, a first side plate 422, a second side plate 423 and two elastic arms 424. The first side plate 422 and the second side plate 423 are respectively connected to two opposite sides of the bottom plate 421, and the first side plate 422 and the second side plate 423 are respectively fixed to the two side parts 412 of the frame body 41. The elastic arm 424 includes an elastic portion 4241 and a blocking portion 4242 that are connected to each other and respectively extend in different directions.

The blocking portions 4242 are swingably connected to the first side plate 422 and the second side plate 423 via the elastic portions 4241, and the elastic portions 4241 respectively press against the side wall parts 25 of the pivotable frame 20. The bottom plate 421, the first side plate 422, the second side plate 423 and the two elastic arms 424 form a second accommodation space 425 therebetween. A hard disk 2 is able to be disposed in the second accommodation space 425, and the blocking portions 4242 of the elastic arms 424 are able to hold the hard disk 2 in position.

In this embodiment, the quantity of the trays 42 is not restricted. In other embodiments, the hard disk bearing frame may include only one or more than two trays.

The base frame 10 further includes two bent parts 14 respectively connected to two opposite sides of the bottom part 11 and extending in the same direction. Two opposite ends of the first link 50 are respectively pivotably connected to one of the side parts 412 of the frame body 41 and one of the bent parts 14 of the base frame 10, such that the first link 50 is able to be pivoted with respect to the hard disk bearing frame 40 about a second axis P2 and to be pivoted with respect to the base frame 10 about a third axis P3.

The handle 60 includes a connecting part 61, a first arm part 62, a second arm part 63 and a protrusion part 64. The first arm part 62, the second arm part 63 and the protrusion part 64 are respectively connected to different sides of the connecting part 61, and the first arm part 62 and the second arm part 63 extend in the same direction. The first arm part 62 and the second arm part 63 are respectively pivotably connected to the side parts 412 of the frame body 41, such that the handle 60 is able to be pivoted with respect to the hard disk bearing frame 40 about a fourth axis P4. Two opposite ends of one of the second link 70 are respectively pivotably connected to the first arm part 62 and one of the side wall parts 25 of the pivotable frame 20. Two opposite ends of the other second link 70 are respectively pivotably connected to the second arm part 63 and the other side wall part 25 of the pivotable frame 20. As such, the second links 70 are able to be pivoted with respect to the handle 60 about a fifth axis P5 and to be pivoted with respect to the pivotable frame 20 about a sixth axis P6.

The circuit board 80 is fixed on the rear part 22 of the pivotable frame 20, and the circuit board 80 has two connectors 81 respectively for the insertions of the hard disks 2.

In this embodiment, the hard disk bearing frame 40 is able to be moved between a level position and an inclined position. The description hereinafter is illustrated in the case that the hard disk fixing assembly 1 is disposed in the casing.

When the hard disk bearing frame 40 is in the level position, the second surface 211 of the bottom part 21 of the pivotable frame 20 presses against the elastic part 12, and the elastic portions 4241 of the tray 42, the first side plate 422 and the second side plate 423 are located in the first accommodation space 26. That is to say, the elastic portions 4241 of the tray 42, the first side plate 422 and the second side plate 423 are located on the same side of the opening 27. At this moment, the elastic portions 4241 are respectively pressed by the side wall parts 25 of the pivotable frame 20 so that a distance L1 between the ends of the blocking portions 4242 away from the elastic portions 4241 is smaller than a width of the hard disks 2. As a result, the hard disk 2 is held in the position in the second accommodation space 425 by the blocking portions 4242; that is, the blocking portions 4242 are able to prevent the hard disk 2 from coming out of the second accommodation space 425.

In addition, when the hard disk bearing frame 40 is in the level position, the second axis P2 is located between the first axis P1 and the third axis P3, the fifth axis P5 is located between the fourth axis P4 and the sixth axis P6, and the fourth axis P4, the fifth axis P5 and the sixth axis P6 are located on a plane S; that is, the fourth axis P4, the fifth axis P5 and the sixth axis P6 are aligned.

As the fourth axis P4, the fifth axis P5 and the sixth axis P6 are aligned, the hard disk bearing frame 40 is limited by the two second links 70 in the direction for sliding with respect to pivotable frame 20, and thus it is unable to be moved with respect to the pivotable frame 20. At this moment, the hard disk bearing frame 40 limits the movement of the first links 50 with respect to the base frame 10. As a result, the force that the elastic part 12 applies on the pivotable frame 20 is unable to pivot the pivotable frame 20. In short, the arrangement that the fourth axis P4, the fifth axis P5 and the sixth axis P6 are located on the same plane S achieves a self-locking function of the hard disk bearing frame 40 and the pivotable frame 20, thereby causing the hard disk bearing frame 40 to be in a dead-point position.

Moreover, when the hard disk bearing frame 40 is in the level position, a part of the protrusion part 64 and the connecting part 61 are respectively located on two opposite sides of the opening 27 of the pivotable frame 20 and the part of the protrusion part 64 protrudes from the pivotable frame 20.

Figure 5:
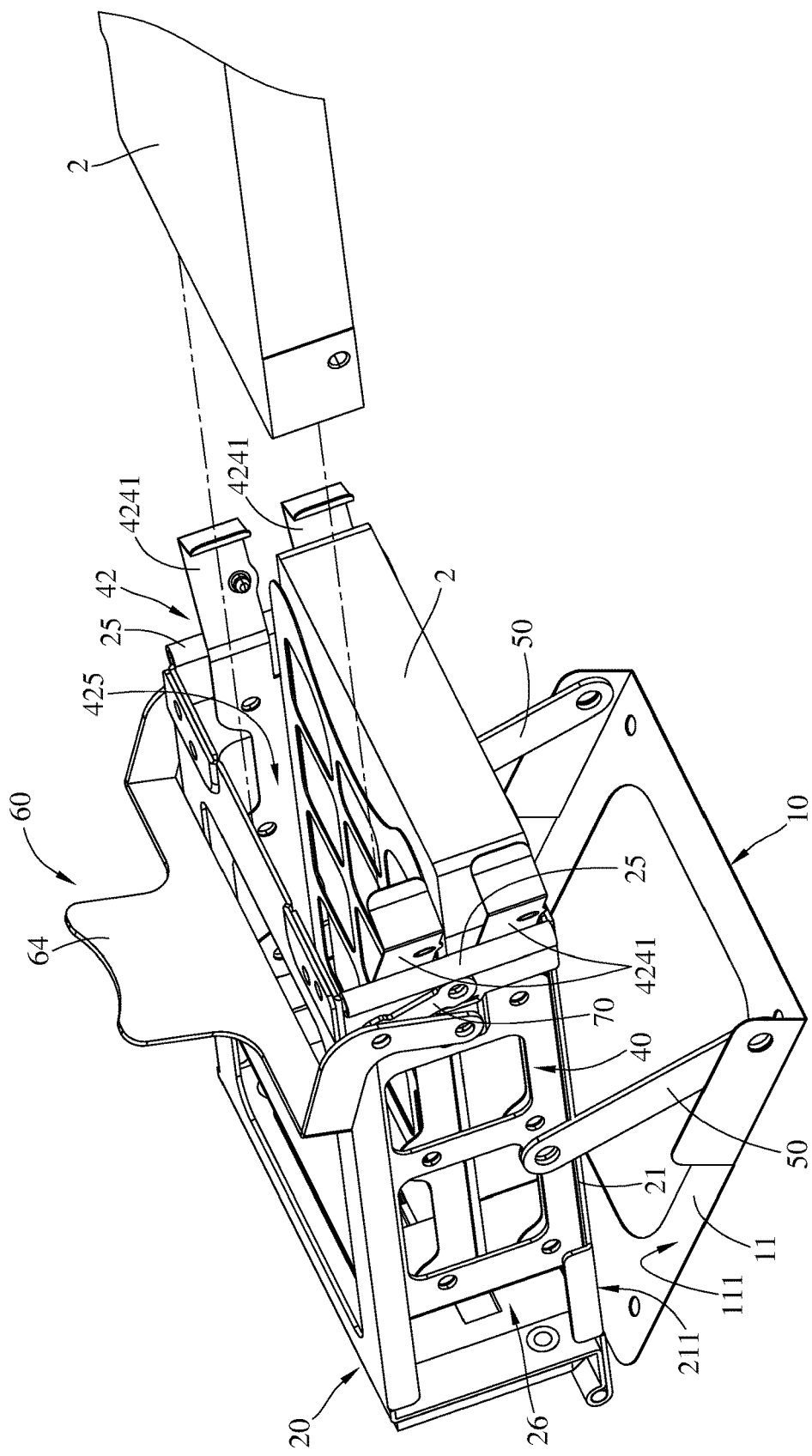
FIG. 5 is a prospective view of the hard disk fixing assembly when its handle is pivoted.
Figure 6:
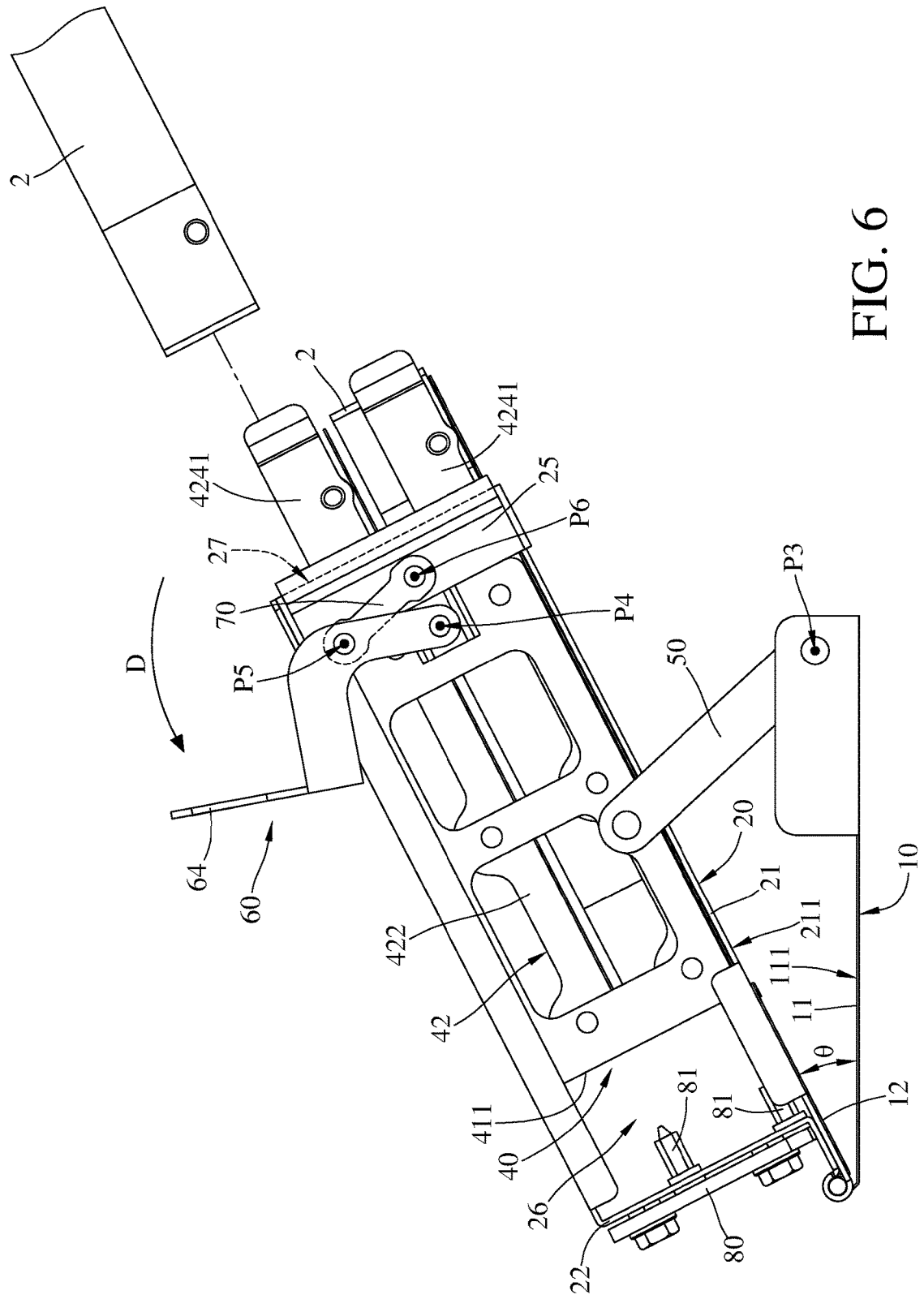
FIG. 6 is a side view of FIG. 5.
Figure 7:
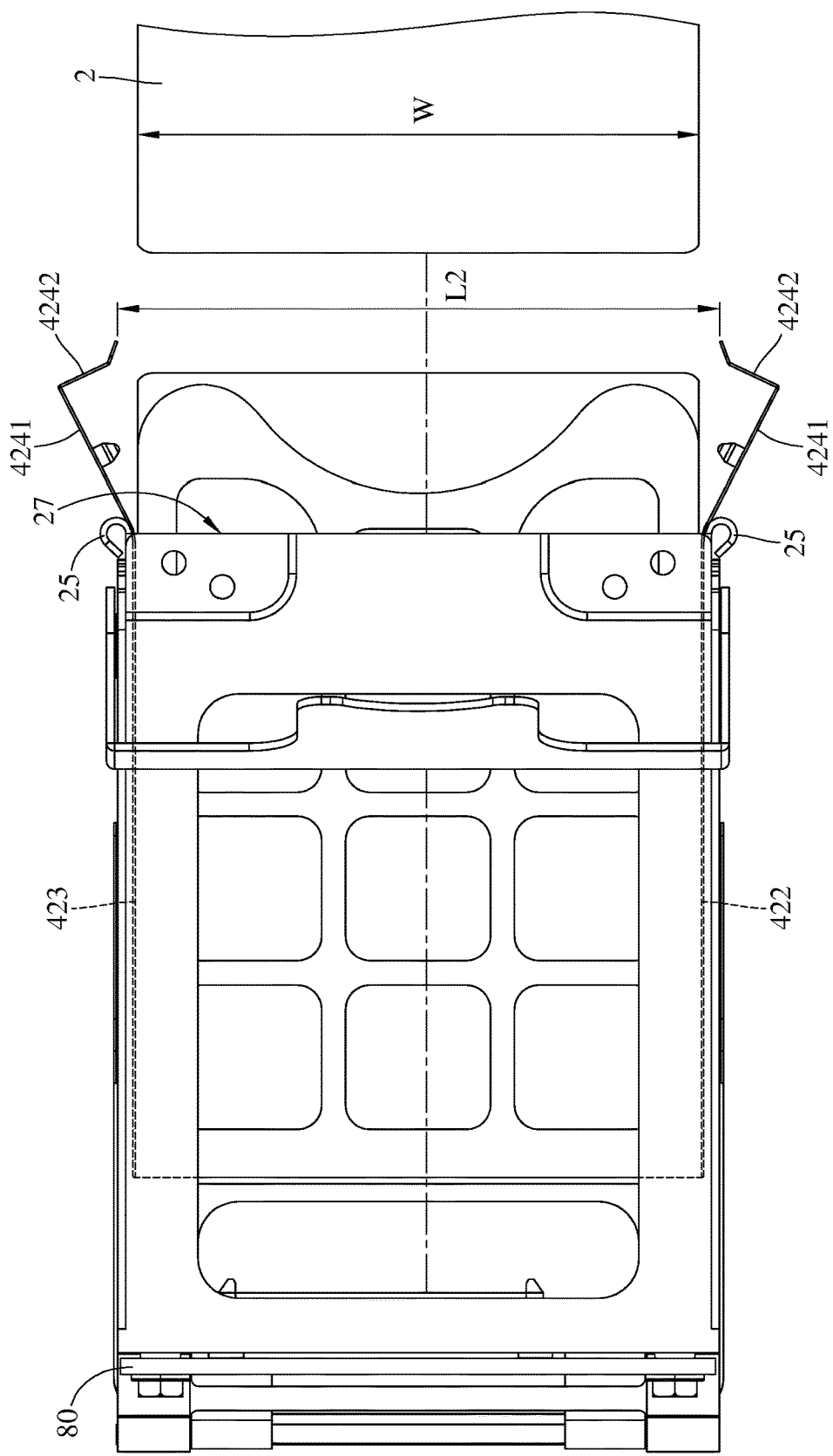
FIG. 7 is a top view of FIG. 5.

Then, please refer to FIG. 5 and FIG. 7, FIG. 5 is a prospective view of the hard disk fixing assembly when its handle is pivoted, FIG. 6 is a side view of FIG. 5, and FIG. 7 is a top view of FIG. 5.

The handle 60 is then pivoted along a direction D so that the handle 60 and the second links 70 force the hard disk bearing frame 40 to move with respect to the pivotable frame 20. It is noted that, when the hard disk bearing frame 40 is in the level position, the portion of the protrusion part 64 that protrudes from the pivotable frame 20 helps the user to move the handle 60. During the movement of the hard disk bearing frame 40, the fourth axis P4 is moved toward the sixth axis P6, the fifth axis P5 is moved away from the bottom part 11 of the base frame 10, and the hard disk bearing frame 40 also forces the first links 50 to pivot with respect to the bottom part 11 of the base frame 10. In such a case, the fourth axis P4, the fifth axis P5 and the sixth axis P6 are not aligned so that the hard disk bearing frame 40 is not in the dead-point position, and the force applied by the elastic part 12 is allowed to incline the pivotable frame 20 to the inclined position. When the pivotable frame 20 is in the inclined position, the second surface 211 of the bottom part 21 and the first surface 111 of the bottom part 11 have an angle θ therebetween.

When the hard disk bearing frame 40 is in the inclined position, the elastic portions 4241 of the trays 42 are located on a side of the opening 27 opposite to the first and second side plates 422 and 423 and the elastic portions 4241 protrude from the opening 27 and are located outside the first accommodation space 26. At this moment, the elastic portions 4241 are not limited by the side wall parts 25 of the pivotable frame 20. Thus, the elastic portions 4241 return to their original positions, and the distance L1 is increased to L2 which is larger than the width W of the hard disks 2. As a result, the hard disk 2 is not held by the blocking portions 4242 and is allowed to pass through the opening 27.

In addition, during the movement of the hard disk bearing frame 40, the connecting part 411 of the hard disk bearing frame 40 is moved away from the rear part 22 of the pivotable frame 20 so as to move the hard disk 2 away from the circuit board 80 and cause the hard disk 2 to be disconnected from the connector 81. Therefore, there is no need to manually disconnect the hard disk 2 from the circuit board 80.

Consequently, the hard disk 2 is allowed to be taken out from the hard disk bearing frame 40 or inserted into the hard disk bearing frame 40.

On the contrary, the hard disk 2 is able to be installed again by pivoting the handle 60 in a direction opposite to the direction D or pushing the pivotable frame 20 toward the bottom part 11 of the base frame 10. By doing so, the fourth axis P4 is moved away from the sixth axis P6 to force the first links 50 to be pivoted about the third axis P3, such that the fourth axis P4, the fifth axis P5, the sixth axis P6 are aligned, the second axis P2 is located between the first axis P1 and the third axis P3, and the hard disk 2 is forced to be inserted into the connector 81 of the circuit board 80.

As described above, the hard disk 2 can be inclined by the hard disk fixing assembly 1, so the removal and installation of the hard disk 2 are convenient even though the hard disk fixing assembly 1 is disposed in a compact server casing.

Additionally, when the handle 60 is pivoted, the hard disk bearing frame 40 is forced to move with respect to the pivotable frame 20 and the elastic part 12 forces the pivotable frame 20 to incline the hard disk bearing frame 40 from the level position to the inclined position. Therefore, a user only needs to pivot the handle 60 to incline the hard disk bearing frame 40 to the inclined position. Thus, the installation and removal of the hard disks 2 by moving the hard disk bearing frame 40 via the handle 60 are convenient.

In this embodiment, after moving the handle 60 so that the fourth axis P4, the fifth axis P5 and the sixth axis P6 are not located in the same plane, the force applied by the elastic part 12 to push the pivotable frame 20 is large enough to incline the hard disk bearing frame 40 to the inclined position, but the invention is not limited to the magnitude of the force applied by the elastic part 12. In other embodiments, after moving the handle so that the fourth axis, the fifth axis and the sixth axis are not located in the same plane, the handle may be manually pivoted.

Moreover, the quantities of the first link 50 and the second link 70 are not restricted. In other embodiments, the quantities of the first and second links may both be one.

According to the hard disk fixing assembly described above, the movement of the handle allows the hard disk bearing frame to move with respect to the pivotable frame and lets the elastic part to incline the hard disk bearing frame to the inclined position from the level position. Thus, the removal and installation of the hard disk are easy and convenient.

In addition, the hard disk can be inclined by the hard disk fixing assembly. Thus, the removal and installation of the hard disk 2 are still convenient even though the hard disk fixing assembly is disposed in a compact environment.

Moreover, when the hard disk bearing frame is in the level position, the fourth axis, the fifth axis and the sixth axis are aligned. Thus, the hard disk bearing frame is limited and unable to be moved with respect to the pivotable frame, achieving a self-locking function of the hard disk bearing frame and the pivotable frame so as to cause the hard disk bearing frame to be in a dead-point position.

Furthermore, when the hard disk bearing frame is moved to the inclined position, the hard disk is disconnected from the circuit board. Therefore, there is no need to manually disconnect the hard disk from the circuit board.

Additionally, when the hard disk bearing frame is in the level position, the portion of the protrusion part that protrudes from the pivotable frame helps the user to move the hard disk bearing frame to the inclined position.

It will be apparent to those skilled in the art that various modifications and variations can be made to the present invention. It is intended that the specification and examples be considered as exemplary embodiments only, with a scope of the invention being indicated by the following claims and their equivalents.

What is claimed is:

1. A hard disk fixing assembly, configured to be disposed in a casing, the hard disk fixing assembly comprising:
   a base frame, comprising a bottom part and an elastic part, the bottom part configured to be fixed to the casing, and the elastic part swingably connected to the bottom part;
   a pivotable frame, pivotably disposed on the base frame, and the elastic part pressing against the pivotable frame;
   a hard disk bearing frame, slidably disposed on the pivotable frame, and the hard disk bearing frame configured to accommodate at least one hard disk;
   at least one first link, two opposite ends of the at least one first link respectively pivotably connected to the hard disk bearing frame and the base frame;
   a handle, pivotably disposed on the hard disk bearing frame; and
   at least one second link, two opposite ends of the at least one second link respectively pivotably connected to the hard disk bearing frame and the pivotable frame;
   wherein, when the handle is pivoted with respect to the hard disk bearing frame, the handle and the at least one second link move the hard disk bearing frame with respect to the pivotable frame, the hard disk bearing frame pivots the pivotable frame with respect to the base frame via the at least one first link, and the pivotable frame is moved by the elastic part so as to incline the hard disk bearing frame from a level position to an inclined position.

2. The hard disk fixing assembly according to claim 1, wherein the pivotable frame is pivotable with respect to the base frame about a first axis, the at least one first link is pivotable with respect to the hard disk bearing frame and the base frame respectively about a second axis and a third axis, the handle is pivotable with respect to the hard disk bearing frame about a fourth axis, the at least one second link is pivotable with respect to the handle and the pivotable frame respectively about a fifth axis and a sixth axis; when the hard disk bearing frame is in the level position, the second axis is located between the first axis and the third axis, and the fifth axis is located between the fourth axis and the sixth axis; while the hard disk bearing frame is moved from the level position to the inclined position, the fourth axis is moved toward the sixth axis so as to pivot the at least one first link with respect to the base frame.

3. The hard disk fixing assembly according to claim 2, wherein when the hard disk bearing frame is in the level position, the fourth axis, the fifth axis and the sixth axis are located on a plane.

4. The hard disk fixing assembly according to claim 1, wherein the hard disk bearing frame comprises a frame body and at least one tray, the frame body is slidably disposed on the pivotable frame, the at least one tray is fixed to the frame body, the at least one tray is configured to accommodate the at least one hard disk, two opposite ends of the at least one first link are respectively pivotably connected to the frame body and the base frame, and the handle is pivotably disposed on the frame body.

5. The hard disk fixing assembly according to claim 4, wherein the at least one tray comprises a bottom plate, a first side plate, a second side plate and at least one elastic arm, the first side plate and the second side plate are respectively connected to two opposite sides of the bottom plate, the first side plate and the second side plate are fixed to the frame body, the at least one elastic arm comprises an elastic portion and a blocking portion that are connected to each other and respectively extend in different directions, the blocking portion is swingably connected to the first side plate via the elastic portion, the elastic portion presses against the pivotable frame, the pivotable frame has an opening; when the pivotable frame is in the level position, the elastic portion and the first side plate are located on a same side of the opening; when the pivotable frame is in the inclined position, the elastic portion protrudes from the opening, and the elastic portion and the first side plate are located on different sides of the opening.

6. The hard disk fixing assembly according to claim 5, wherein a quantity of the at least one elastic arm is two, the elastic portions of the elastic arms are respectively connected to the first side plate and the second side plate, and the elastic portions both press against the pivotable frame; when the hard disk bearing frame is in the level position, the elastic portions, the first side plate and the second side plate are all located on the same side of the opening; when the hard disk bearing frame is in the inclined position, the elastic portions are located on a side of the opening opposite to the first side plate and the second side plate.

7. The hard disk fixing assembly according to claim 5, wherein the handle comprises a connecting part, a first arm part, a second arm part and an protrusion part, the first arm part, the second arm part and the protrusion part are respectively connected to different sides of the connecting part, the first arm part and the second arm part extend in a same direction, the first arm part and the second arm part are respectively pivotably connected to two opposite sides of the frame body of the hard disk bearing frame, two opposite ends of the at least one second link are respectively pivotably connected to the first arm part and the pivotable frame; when the handle is in the level position, a part of the protrusion part and the connecting part are respectively located on two opposite sides of the opening of the pivotable frame.

8. The hard disk fixing assembly according to claim 1, further comprises a circuit board disposed on the pivotable frame; when the handle is pivoted with respect to the hard disk bearing frame, the handle and the at least one second link move the hard disk bearing frame away from or toward the circuit board.

* * * * *